E. O. LEECH & W. KERR.
GATE OPERATING MECHANISM.
APPLICATION FILED SEPT. 13, 1916.
1,262,066.
Patented Apr. 9, 1918.
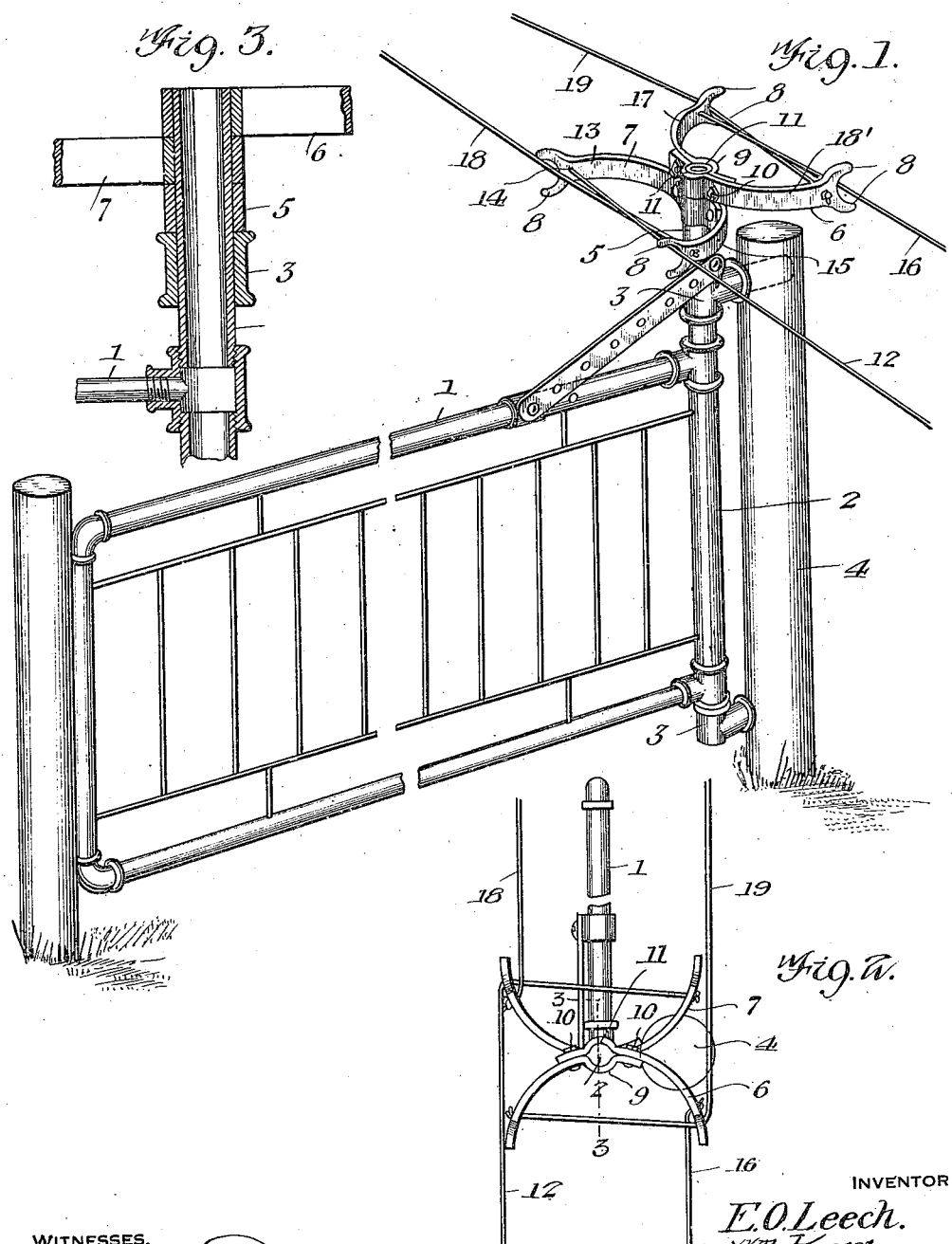
INVENTOR
E. O. Leech.
Wm Kerr.
BY Victor J. Evans
ATTORNEY
WITNESSES

UNITED STATES PATENT OFFICE.

EDWARD O. LEECH AND WILLIAM KERR, OF HEBRON, ILLINOIS.

GATE-OPERATING MECHANISM.

1,262,066.　　　　　Specification of Letters Patent.　　Patented Apr. 9, 1918.

Application filed September 13, 1916.　Serial No. 119,995.

*To all whom it may concern:*

Be it known that we, EDWARD O. LEECH and WILLIAM KERR, citizens of the United States, residing at Hebron, in the county of McHenry and State of Illinois, have invented new and useful Improvements in Gate-Operating Mechanism, of which the following is a specification.

This invention comprehends improvements in gate operating mechanism and relates particularly to means whereby a gate may be swung into open or closed position from either side thereof and at a distance therefrom.

One of the objects of the invention is to provide an operating mechanism of extremely simple construction including a pair of semi-circular members secured to the gate and having attached thereto pull cords or ropes by means of which the gate may be swung about its pivot point.

The invention also aims to generally improve devices of this nature to render them more practical, substantial and commercially desirable.

With these and other objects in view, as will become more apparent as the description proceeds, the invention consists in certain novel features of construction, combination and arrangement of parts as will be hereinafter fully described, illustrated and claimed.

In the drawings,

Figure 1 is a perspective view showing the gate in closed position with our improved operating mechanism attached thereto.

Fig. 2 is a top plan view showing the gate in open position, and

Fig. 3 is a fragmentary vertical sectional view on the plane of line 3—3 of Fig. 2.

Referring in detail to the drawings by numerals, 1 designates as an entirety a gate having a post 2 which is rotatable within the collars or hangers 3 secured to an upright or post 4. A sleeve or collar 5 is secured to the post 2 to rotate therewith and by bearing against the hanger 3 holds the post against downward movement.

In the preferred embodiment of our invention, we provide a pair of substantially semi-circular heads or operating members 6 and 7 having their extremities forked to provide the rope guiding arms 8. These heads or operating members are secured in superposed relation to the post 2 at the top thereof and are each formed of a pair of mated sections secured together by bolts 10. The opposed end portions are bent to form arcuate recesses 11 which receive the post.

A pull rope 12 is secured at one end to the arm 13 of the operating member 7 by being passed through an opening 14 in said operating member and knotted. The rope extends from the arm 13 through the forked end of the corresponding arm 15 and when pulled will swing the gate into open position.

A second pull rope 16 is similarly connected to the arm 17 of the operating member 6 and extends through the forked end of the arm 18' and when the gate is opened may be pulled to close the gate.

A rope 18 is provided for opening the gate in the opposite direction from which the rope 12 swings the gate and a rope 19 is employed for closing the gate when opened by the rope 18. The ropes 18 and 19 are connected to the arms 15 and 18 respectively and pass through the forked ends of the arms 13 and 17 respectively.

It is desired to direct attention to the extreme simplicity of the operating mechanism which makes it very cheap to manufacture so that it may be sold at a comparatively low cost. The structure is very substantial and the method of attaching the operating members by the bolts 10 makes it possible to easily assemble and disassemble the device when occasion arises. The point of connection of the pull ropes to the operating members, being a considerable distance from the pivotal center of the gate, provides a substantial leverage so that the gate may be easily operated and the forked ends of the arms prevent the ropes from becoming displaced.

While we have shown and described the preferred embodiments of our invention, it will be clearly understood that we do not wish to be limited to this construction, but may make such changes as will fall within the scope and spirit of the invention as claimed.

What we claim is:

1. In combination with a gate having a rotatable pivot post, a pair of semi-circular operating members secured in superposed relation to the post adjacent its upper end and extending on opposite sides of the post, said operating members being provided with forked terminals, a pull rope connected to each of said operating members adjacent their terminal and passing through the corresponding forked terminal, said pull ropes running in opposite directions whereby the gate may be opened and closed from either side.

2. In combination with a swinging gate having a rotatable pivot post, a pair of semicircular operating members secured to said post in superposed relation adjacent its upper end and extending in opposite directions, the operating members being formed at their terminals with spaced guide arms, and operating ropes connected to said operating members adjacent one of their ends and extending through the guide arms on the corresponding terminal.

In testimony whereof, we have signed our names to this specification.

EDWARD O. LEECH.
WM. KERR.

Copies of this patent may be obtained for five cents each, by addressing the "Commissioner of Patents, Washington, D. C."